US010255480B2

(12) United States Patent
Uhlenbrock et al.

(10) Patent No.: US 10,255,480 B2
(45) Date of Patent: Apr. 9, 2019

(54) MONITORING OBJECT SHAPE AND DEVIATION FROM DESIGN (71) Applicant: THE BOEING COMPANY, Chicago, IL (US)

(72) Inventors: Ryan Uhlenbrock, Calabasas, CA (US); Deepak Khosla, Camarillo, CA (US); Yang Chen, Westlake Village, CA (US); Kevin R. Martin, Oak Park, CA (US)

(73) Assignee: THE BOEING COMPANY, Chicago, IL (US)

( * ) Notice: Subject to any disclaimer, the term of this patent is extended or adjusted under 35 U.S.C. 154(b) by 44 days.

(21) Appl. No.: 15/595,806

(22) Filed: May 15, 2017

(65) Prior Publication Data

US 2018/0330149 A1 Nov. 15, 2018

(51) Int. Cl.
*G06K 9/00* (2006.01)
*G06T 7/00* (2017.01)
*G06T 7/11* (2017.01)
*G06T 7/30* (2017.01)

(52) U.S. Cl.
CPC .......... *G06K 9/00214* (2013.01); *G06T 7/001* (2013.01); *G06T 7/11* (2017.01); *G06T 7/30* (2017.01); *G06T 2207/10028* (2013.01); *G06T 2207/30108* (2013.01)

(58) Field of Classification Search
CPC ........ G06K 9/00214; G06T 7/11; G06T 7/001
USPC ....................................................... 382/154
See application file for complete search history.

(56) References Cited

U.S. PATENT DOCUMENTS

| 2009/0157363 A1 | 6/2009 | Barnes et al. | |
| 2009/0160852 A1 | 6/2009 | Chang et al. | |
| 2015/0199802 A1* | 7/2015 | Freeman | G06T 7/001 348/129 |
| 2018/0144555 A1* | 5/2018 | Ford | G06T 15/04 |

OTHER PUBLICATIONS

Akinci, et al., "A Formalism for Utilization of Sensor Systems and Integrated Project Models for Active Construction Quality Control", Automation in Construction, 15.2, 2006, Carnegie Mellon University, pp. 124-138.

(Continued)

*Primary Examiner* — Justin P. Misleh
(74) *Attorney, Agent, or Firm* — Toler Law Group, P.C.

(57) ABSTRACT

A system includes a processor configured to generate a registered first 3D point cloud based on a first 3D point cloud and a second 3D point cloud. The processor is configured to generate a registered second 3D point cloud based on the first 3D point cloud and a third 3D point cloud. The processor is configured to generate a combined 3D point cloud based on the registered first 3D point cloud and the registered second 3D point cloud. The processor is configured to compare the combined 3D point cloud with a mesh model of the object. The processor is configured to generate, based on the comparison, output data indicating differences between the object as represented by the combined 3D point cloud and the object as represented by the 3D model. The system includes a display configured to display a graphical display of the differences.

20 Claims, 4 Drawing Sheets (56) References Cited

OTHER PUBLICATIONS

Martinez, et al., "Analysis of laser scanning and strategies for dimensional and geometrical control", The International Journal of Advanced Manufacturing Technology, 46.5-8, 2010, pp. 621-629.
Extended European Search Report for Application No. 18152070.1 dated Jul. 16, 2018, 11 pgs.
Hong-Seok, P. et al., Development of an Inspection System for Defect Detection in Pressed Parts using Laser Scanned Data, 24th DAAAM International Symposium on Intelligent Manufacturing Automation, Science Direct, Procedia Engineering, vol. 69, 2014, pp. 931-936.

* cited by examiner

MONITORING OBJECT SHAPE AND DEVIATION FROM DESIGN

FIELD OF THE DISCLOSURE

The present disclosure relates to defect detection.

BACKGROUND

An object being built may be manually measured to determine dimensions of the object as built. The dimensions of the object as built can be compared to dimensions of the object as designed to identify deviations between the object as built and the object as designed. Alternatively, systems may compare an as-built model with an as-designed model to identify deviations between the models. These systems typically require manual registration between the as-built model and the as-designed model, do not operate in real time, and analyze the differences on an object level.

SUMMARY

In some implementations, a system includes a first sensor configured to generate first sensor data. The system includes a second sensor configured to generate second sensor data. The system includes memory configured to store a three-dimensional (3D) model of an object. The system includes a processor configured to generate a registered first 3D point cloud based on a first 3D point cloud and a second 3D point cloud. The second 3D point cloud is based on the first sensor data, and the first 3D point cloud is based on a 3D model of the object. The processor is configured to generate a registered second 3D point cloud based on the first 3D point cloud and a third 3D point cloud that is based on the second sensor data. The processor is configured to generate a combined 3D point cloud based on the registered first 3D point cloud and the registered second 3D point cloud. The processor is configured to compare the combined 3D point cloud with a mesh model of the object that is based on the 3D model of the object. The processor is configured to generate, based on the comparison, output data indicating differences between the object as represented by the combined 3D point cloud and the object as represented by the 3D model of the object. The system includes a display configured to display a graphical display of the differences based on the output data.

In some implementations, a method includes generating a registered first 3D point cloud based on a first 3D point cloud and a second 3D point cloud. The second 3D point cloud is based on first sensor data from a first sensor. The first 3D point cloud is based on a 3D model of an object. The method includes generating a registered second 3D point cloud based on the first 3D point cloud and a third 3D point cloud. The third 3D point cloud is based on second sensor data from a second sensor. The method includes generating a combined 3D point cloud based on the registered first 3D point cloud and the registered second 3D point cloud. The method includes comparing the combined 3D point cloud with a mesh model of the object that is based on the 3D model of the object. The method includes generating, based on the comparison, output data indicating differences between the object as represented by the combined 3D point cloud and the object as represented by the 3D model of the object.

In a particular implementation, a processor readable medium storing processor executable instructions that, when executed by the processor, cause the processor to generate a registered first 3D point cloud based on a first 3D point cloud and a second 3D point cloud. The second 3D point cloud is based on first sensor data from a first sensor, and the first 3D point cloud is based on a 3D model of an object. The instructions, when executed by the processor, cause the processor to generate a registered second 3D point cloud based on the first 3D point cloud and a third 3D point cloud. The third 3D point cloud is based on second sensor data from a second sensor. The instructions, when executed by the processor, cause the processor to generate a combined 3D point cloud based on the registered first 3D point cloud and the registered second 3D point cloud. The instructions, when executed by the processor, cause the processor to compare the combined 3D point cloud with a mesh model of the object that is based on the 3D model of the object. The instructions, when executed by the processor, cause the processor to generate, based on the comparison, output data indicating differences between the object as represented by the combined 3D point cloud and the object as represented by the 3D model of the object.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Examples described herein include a system that determines differences between an as-built model (generated based on data from multiple sensors) of an object and an as-designed model (e.g., a computer aided design (CAD) model) of the object. The system registers, segments, or both, point clouds of scenes (including the object) from the multiple sensors to a point cloud generated from the as-designed model. The registered point clouds from the sensors are fused to generate a combined point-cloud model. The system includes a comparator to compare the combined point-cloud model to a mesh model of the object that is generated from the as-designed model. The comparator determines differences between the combined point-cloud model and the mesh model. In some examples, the system generates a sequence of combined three dimensional (3D) point cloud models based on streaming sensor data from the multiple sensors and compares each of the combined 3D point cloud models to the mesh model to enable monitoring the object for deviation from design in real time.

Figure 1:
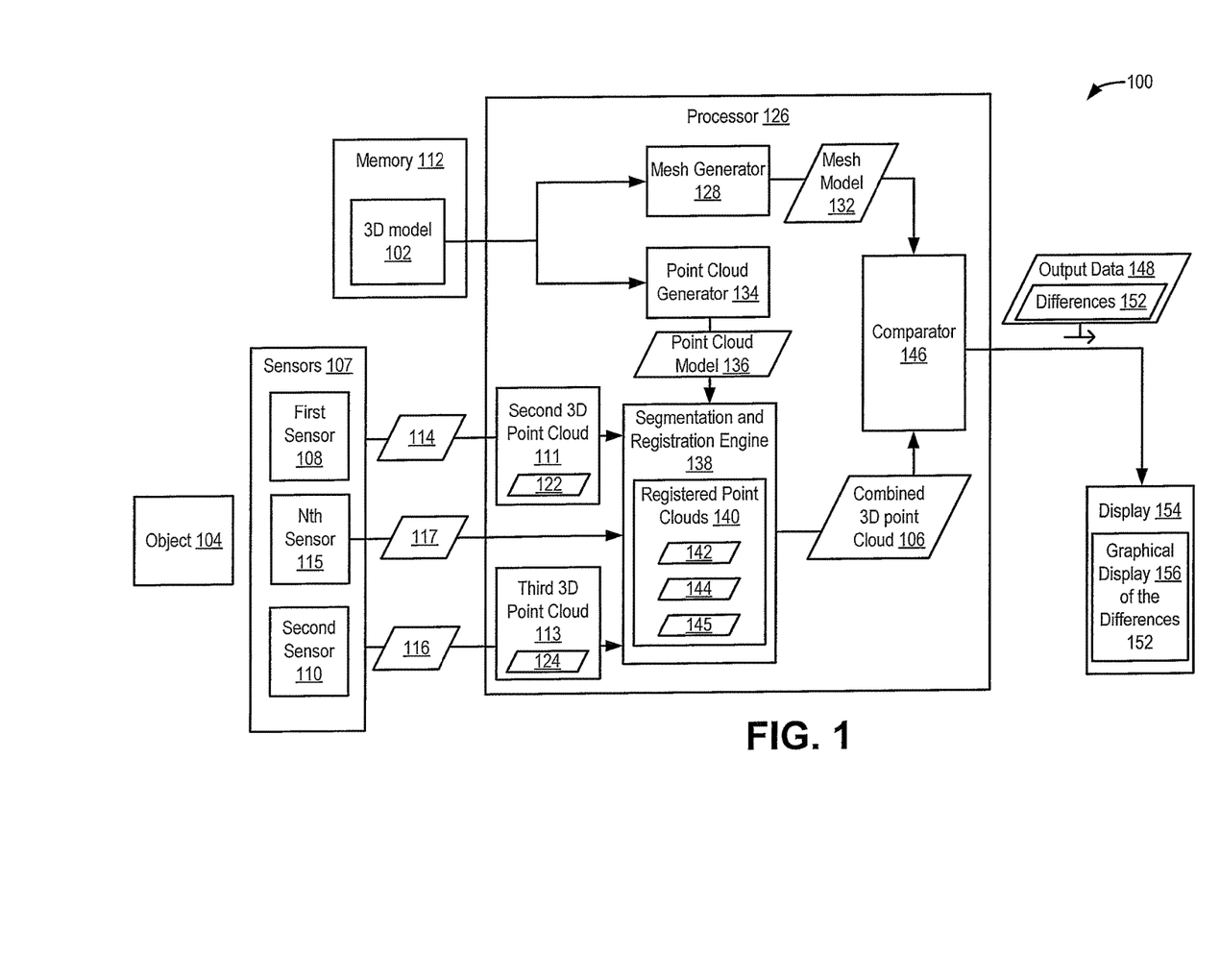
FIG. 1 illustrates a block diagram of a system configured to generate output data indicating differences between a mesh model of an object and a combined three-dimensional (3D) point cloud based on sensor data from multiple sensors.

FIG. 1 illustrates a block diagram of a system 100 configured to determine differences between a 3D model 102 (e.g., an as-designed model) of an object 104 and a combined 3D point cloud 106 (e.g., an as-built model). The system 100 includes a processor 126 and memory 112. The memory 112 is configured to store one or more 3D models, such as the 3D model 102. In some examples, the 3D model 102 corresponds to a CAD model of the object 104 (as designed).

The system 100 includes a plurality of sensors 107, such as a first sensor 108 and a second sensor 110. In some implementations, the plurality of sensors 107 includes more than two sensors. To illustrate, in FIG. 1, the system 100 includes N sensors (including an Nth sensor 115), where is an integer greater than two. During operation of the system 100, each of the plurality of sensors 107 has a different field of view than the other sensors of the plurality of sensors 107. During operation, each of the plurality of sensors 107 is configured to capture data (e.g., image data) of a scene corresponding to the field of view of the sensor. During operation, the plurality of sensors 107 are configured such that the field of view of each of the plurality of sensors 107 includes the object 104 (e.g., the scenes captured by the plurality of sensors 107 include the object 104). Although the description primarily focuses on examples in which the object 104 is being monitored, in other examples, the system 100 is configured to monitor multiple objects. For example, the system 100 may be configured to monitor multiple objects (e.g., for proper alignment) during joining of the multiple objects during a manufacturing process. In examples in which the system 100 is configured to monitor multiple objects, the scenes captured by plurality of sensors 107 may include multiple objects. Additionally, the scene of one or more of the plurality of sensors 107 may include components other than the object 104. Points corresponding to the additional components other than the object 104 may be removed during segmentation and registration described below.

The plurality of sensors 107 includes 3D sensors. In some examples, the plurality of sensors 107 includes a stereo camera, a time-of-flight camera, a scanning light detection and ranging (LIDAR) system, structured light cameras, or a combination thereof. In some examples, the plurality of sensors 107 includes different types of sensors. For example, a first sensor 108 may include a stereo camera and a second sensor 110 may include a time-of-flight camera.

The first sensor 108 is configured to generate first sensor data 114. The first sensor data 114 may correspond to or include multiple frames of data. The system 100 is configured to generate one or more point clouds based on the first sensor data 114. For example, the system 100 is configured to generate a second 3D point cloud 111 based on the first sensor data 114. The system 100 may generate a plurality of point clouds based on the first sensor data 114. For example, the first sensor data 114 may include multiple frames of data, and the system 100 may generate a point cloud based on each of the multiple frames of data of the first sensor data 114.

The first sensor 108 may be configured to generate the first sensor data 114 in the form of depth image data (e.g., a two-dimensional grid of pixels). For example, each frame of the multiple frames of data of the first sensor data 114 may correspond to a depth image. Each pixel of the depth image defined by the depth image data specifies a range from the first sensor 108 to a nearest point in the scene captured by the first sensor 108. The first sensor 108 or the processor 126 is configured to process the depth image data (e.g., based on intrinsic parameters of the first sensor 108) to generate the one or more point clouds including second 3D point cloud 111. Thus, the second 3D point cloud 111 is based on data from the first sensor 108 (e.g., is based on the first sensor data 114).

The second sensor 110 is configured to generate second sensor data 116. The second sensor data 116 may correspond to or include multiple frames of data. The system 100 is configured to generate one or more point clouds based on the second sensor data 116. For example, the system 100 is configured to generate a third 3D point cloud 113 based on the second sensor data 116. The system 100 may generate a plurality of point clouds based on the second sensor data 116. For example, the second sensor data 116 may include multiple frames of data, and the system 100 may generate a point cloud based on each of the multiple frames of data of the second sensor data 116.

The second sensor 110 may be configured to generate the second sensor data 116 in the form of depth image data (e.g., a two-dimensional grid of pixels). For example, each frame of the multiple frames of data of the first sensor data may correspond to a depth image. Each pixel of the depth image defined by the depth image data specifies a range from the second sensor 110 to a nearest point in the scene captured by the second sensor 110. The second sensor 110 or the processor 126 is configured to process the depth image data (e.g., based on intrinsic parameters of the second sensor 110) to generate the one or more point clouds including third 3D point cloud 113. Thus, the third 3D point cloud 113 is based on data from the second sensor 110 (e.g., is based on the second sensor data 116).

Although the description herein primarily focuses on examples in which the plurality of sensors 107 includes two sensors (e.g., the first sensor 108 and the second sensor 110), in other examples, the plurality of sensors 107 includes N sensors, where N is greater than two. In such examples, the combined 3D point cloud 106 is generated based on point clouds from sensor data of more than two sensors. For example, in FIG. 1, the Nth sensor 115 is configured to provide sensor data 117 to the processor 126. In this example, the sensor data 117 is used to generate one or more additional registered point clouds 145, which are combined with first and second registered point clouds 142, 144 to generate the combined 3D point cloud 106.

Thus, the system 100 may be configured to generate a stream of point clouds from data from the plurality of sensors 107. Each of the point clouds includes points corresponding to the object 104. For example, the second 3D point cloud 111 includes first points 122 corresponding to the object 104, and may include additional points corresponding to other parts of the scene captured by the first sensor 108. As another example, the third 3D point cloud 113 includes second points 124 corresponding to the object 104, and may include additional points corresponding to other parts of the scene captured by the second sensor 110. Each of the point clouds generated by the system 100 is associated with a capture time of the sensor data on which the point cloud is based. For example, the first sensor data 114 may include a first frame captured at the first time, and the second sensor data 116 may include a second frame captured at the first time. In this example, the second 3D point cloud 111 generated based on the first frame may correspond to the same time as the third 3D point cloud 113 generated based on the second frame. As described below, registered point clouds associated with the same time are combined to form a combined 3D point cloud 106.

The processor 126 includes a mesh generator 128 configured to generate a mesh model 132 of the object 104 based on the 3D model 102. In some examples, memory 112 stores multiple 3D models or multiple objects including the object 104, and the system 100 is configured to perform an object recognition operation to recognize the object 104 and to select the 3D model 102 based on the system 100 recognizing the object 104.

The mesh model 132 includes a plurality of vertices, edges, and faces, such as polygons (e.g., triangles), that define a shape of the object 104 as designed. A size of the mesh faces of the mesh model 132 determines the resolution of the output of the system 100. The resolution (and thus the size of the mesh faces) may be selected based on the scale of the deformations or defects expected to be encountered, the expected density of the combined 3D point cloud 106, or a combination thereof.

The processor 126 additionally includes a point cloud generator 134 configured to generate a first 3D point cloud 136 that represents surfaces of the object 104 as designed. The processor 126 may be configured to generate the first 3D point cloud 136 by sampling surfaces of the 3D model 102. In some examples, the processor 126 may randomly sample the 3D model 102. A higher density of the sampling (e.g., a number of the points of the first 3D point cloud 136) may provide a more accurate registration than lower density sampling.

The processor 126 additionally includes a segmentation and registration engine 138 configured to generate registered point clouds 140 corresponding to the one or more 3D point clouds that are generated based on data from the plurality of sensors 107 (e.g., based on the first sensor data 114, the second sensor data 116, and Nth sensor data 117). For example, the segmentation and registration engine 138 is configured to generate a registered first 3D point cloud 142 based on the first 3D point cloud 136 and the second 3D point cloud 111, and to generate a registered second 3D point cloud 144 based on the first 3D point cloud 136 and the third 3D point cloud 113. If the system 100 includes more than two sensors, the segmentation and registration engine 138 is configured to generate an Nth registered 3D point cloud 145 based on the Nth sensor data 117. Each registered point cloud 142, 144, 145 is registered to the coordinate system of the 3D model 102 (e.g., to the coordinate system of the first 3D point cloud 136).

In some examples, the segmentation and registration engine 138 is configured to generate the registered point clouds 140 by individually registering the one or more point clouds from the plurality of sensors 107 to the first 3D point cloud 136. To illustrate, the segmentation and registration engine 138 may be configured to generate the registered first 3D point cloud 142 by segmenting the second 3D point cloud 111 to identify the first points 122 that correspond to the object 104 and to remove the remaining points of the second 3D point cloud 111. Segmenting the second 3D point cloud 111 generates a segmented first point cloud. In some examples, the second 3D point cloud 111 is segmented based on a last known position and pose of the object 104 in the coordinate system of the first sensor 108. For example, the processor 126 may be configured to determine a distance of points of the second 3D point cloud 111 from the object 104 based on a last known position and pose of the object 104. Points of the second 3D point cloud 111 that are more than a distance threshold away from the object 104 as indicated based on the last known position and pose of the object 104 in the coordinate system of the first sensor 108 may be removed or discarded. The remaining points are (e.g., the segmented second point cloud is) then registered to the first 3D point cloud 136 to generate the registered first 3D point cloud 142. In some examples, the processor 126 is configured to execute an iterative closest point (ICP) technique to register the segmented first point cloud to the first 3D point cloud 136. Thus, the processor 126 is configured to generate the registered first 3D point cloud 142 based on the first 3D point cloud 136 and the second 3D point cloud 111.

As another example, in some implementations, the segmentation and registration engine 138 is configured to generate the registered second 3D point cloud 144 by segmenting the third 3D point cloud 113 to identify the second points 124 that correspond to the object 104 and to remove the remaining points of the third 3D point cloud 113. Segmenting the third 3D point cloud 113 generates a segmented third 3D point cloud. In some examples, the third 3D point cloud 113 is segmented based on a last known position and pose of the object 104 in the coordinate system of the second sensor 110. For example, the processor 126 may be configured to determine a distance of points of the third 3D point cloud 113 from the object 104 based on a last known position and pose of the object 104. Points of the third 3D point cloud 113 that are more than a distance threshold away from the object 104 as indicated based on the last known position and pose of the object 104 in the coordinate system of the second sensor 110 may be removed or discarded. The remaining points are (e.g., the segmented third point cloud is) then registered to the first 3D point cloud 136 to generate the registered second 3D point cloud 144. In some examples, the processor 126 is configured to execute an iterative closest point (ICP) technique to register the segmented third point cloud to the first 3D point cloud 136. Thus, the processor 126 is configured to generate the registered second 3D point cloud 144 based on the first 3D point cloud 136 and the third 3D point cloud 113.

Similar operations may be performed to generated other registered point clouds (e.g., the Nth registered point cloud) if the system 100 includes more than two sensors. The segmentation and registration engine 138 is therefore configured to generate the registered point clouds 140 for the point clouds from the plurality of sensors 107. The registered point clouds 140 are registered to a coordinate system of the 3D model 102.

In some examples, the segmentation and registration engine 138 is configured to generate the registered 3D point clouds 140 based on the one or more point clouds from the plurality of sensors 107 using a k-d tree and subtree caching. A root node of the k-d tree corresponds to or includes all points of the first 3D point cloud 136. Leaf nodes of the k-d tree include a single point or multiple points of the first 3D point cloud 136. Each node of the k-d tree breaks up the 3D points of the first 3D point cloud 136 that correspond to the node into two halves by dividing 3D points by a plane that is normal to a dimension with the highest variance. In some examples, the segmentation and registration engine 138 performs the subtree caching using an array data structure for the point clouds from the first sensor data 114 and an array structure for the point clouds from the second sensor data 116. For example, the segmentation and registration engine 138 may use a first array data structure for the second 3D point cloud 111 and a second array data structure for the third 3D point cloud 113. The array data structure for point clouds based on the first sensor data 114 has the same dimensions as the first sensor data 114, and the array data structure for point clouds based on the second sensor data 116 has the same dimensions as the second sensor data 116. Each array element of each of the array data structures includes a pointer to the location in memory of a node in the k-d tree. A pointer to the subtree containing the last known nearest point of the first 3D point cloud 136 to each input pixel is stored (cached) in the array data structure. This cached pointer is used as the starting point for the next nearest neighbor search.

To illustrate, in some examples, the processor 126 is configured to employ a first k-d tree and a first array data structure to generate the registered first 3D point cloud 142. The segmentation and registration engine 138 is configured to transform the second 3D point cloud 111 from the coordinate system of the first sensor 108 to the coordinate system of the 3D model 102 using a transformation matrix from a most recent segmentation and registration operation performed on a point cloud from the first sensor data 114. For example, the transformation matrix may be a transformation matrix determined during a preceding iteration of the segmentation and registration operation performed on the second 3D point cloud 111. Alternatively or additionally, the transformation matrix may be a transformation matrix determined for a point cloud that is based on a preceding frame (e.g., a preceding 3D point cloud) of the first sensor data 114. For each point in the second 3D point cloud 111, the search for a closest point in the first 3D point cloud 136 begins at the node of the first k-d tree identified by the cached pointer in the element of the first array data structure that corresponds to the point in the second 3D point cloud 111. For example, the coordinates of the pixel in the first sensor data 114 that corresponds to the point in the second 3D point cloud 111 correspond to the coordinates of the cached pointer (in the first array data structure) associated with the point in the second 3D point cloud 111. The search leads to the leaf node of the first k-d tree that includes the point of the first 3D point cloud 136 that is closest to the point of the second 3D point cloud 111 based on L2 norm Euclidean distance. If the distance between the point in the first 3D point cloud 136 that is closest to the point of the second 3D point cloud 111 is less than a reset threshold, the coordinates of the closest point in the first 3D point cloud 136 are added to a list of correspondences. If the distance is greater than the reset threshold, a new search is started from the root of the first k-d tree, leading to a leaf node of the first k-d tree that includes the point of the first 3D point cloud 136 that is closest to the point of the second 3D point cloud 111. The coordinates of the closest point are added to the list of correspondences. The processor 126 is configured to update the cache by setting a pointer (in the corresponding element of the first array data structure) to a node of the first k-d tree that is a particular height above the leaf node of the first k-d tree that is associated with the point of the first 3D point cloud 136 that is closest to the point of the second 3D point cloud 111. The search is performed for every point in the second 3D point cloud 111, resulting in a list of correspondences between the second 3D point cloud 111 and the first 3D point cloud 136.

Point correspondences between points more than a threshold Euclidean distance apart are discarded. Discarding the point correspondences between points that are more than the threshold Euclidean distance apart corresponds to segmenting the point cloud. The point correspondences remaining after the segmentation stage is performed are used to estimate the transformation matrix. In some examples, the transformation matrix is estimated using a singular value decomposition. The nearest neighbor search, the segmentation, and the transformation matrix estimation stages are iterated until a new input frame is available from the first sensor 108 or until a pre-determined number of iterations is performed. The points of the second 3D point cloud 111 that remain at the last iteration correspond to the registered first 3D point cloud 142.

As another example, in some implementations, the processor 126 is configured to employ a second k-d tree and a second array data structure to generate the registered second 3D point cloud 144. The segmentation and registration engine 138 is configured to transform the third 3D point cloud 113 from the coordinate system of the first sensor 108 to the coordinate system of the 3D model 102 using a transformation matrix from a most recent segmentation and registration operation performed on a point cloud from the second sensor data 116. For example, the transformation matrix may be a transformation matrix determined during a preceding iteration of the segmentation and registration operation performed on the third 3D point cloud 113. Alternatively or additionally, the transformation matrix may be a transformation matrix determined for a point cloud that is based on a preceding frame (e.g., a preceding 3D point cloud) of the second sensor data 116. For each point in the third 3D point cloud 113, the search for a closest point in the first 3D point cloud 136 begins at the node of the second k-d tree identified by the cached pointer in the element of the second array data structure that corresponds to the point in the third 3D point cloud 113. For example, the coordinates of the pixel in the second sensor data 116 that corresponds to the point in the third 3D point cloud 113 correspond to the coordinates of the cached pointer (in the first array data structure) associated with the point in the third 3D point cloud 113. The search leads to the leaf node of the second k-d tree that includes the point of the first 3D point cloud 136 that is closest to the point of the third 3D point cloud 113 based on L2 norm Euclidean distance. If the distance between the point in the first 3D point cloud 136 that is closest to the point of the third 3D point cloud 113 is less than a reset threshold, the coordinates of the closest point in the first 3D point cloud 136 are added to a list of correspondences. If the distance is greater than the reset threshold, a new search is started from the root of the second k-d tree, leading to a leaf node of the second k-d tree that includes the point of the first 3D point cloud 136 that is closest to the point of the third 3D point cloud 113. The coordinates of the closest point are added to the list of correspondences. The processor 126 is configured to update the cache by setting a pointer (in the corresponding element of the second array data structure) to a node of the second k-d tree that is a particular height above the leaf node of the second k-d tree that is associated with the point of the first 3D point cloud 136 that is closest to the point of the third 3D point cloud 113. The search is performed for every point in the third 3D point cloud 113, resulting in a list of correspondences between the third 3D point cloud 113 and the first 3D point cloud 136.

Point correspondences between points more than a threshold Euclidean distance apart are discarded. Discarding the point correspondences between points that are more than the threshold Euclidean distance apart corresponds to segmenting the point cloud. The point correspondences remaining after the segmentation stage is performed are used to estimate the transformation matrix. In some examples, the transformation matrix is estimated using a singular value decomposition. The nearest neighbor search, the segmentation, and the transformation matrix estimation stages are iterated until a new input frame is available from the second sensor 110 or until a pre-determined number of iterations is performed. The points of the third 3D point cloud 113 that remain at the last iteration correspond to the registered second 3D point cloud 144.

Generating the registered first 3D point cloud 142 using the above-described k-d tree and subtree caching technique may enable more point clouds from the plurality of sensors 107 to be registered than can be registered in the same amount of time by systems that do not employ a k-d tree and subtree caching, thereby enabling the system 100 to achieve real-time registration.

The processor 126 (e.g., the segmentation and registration engine 138) is configured to fuse or combine registered point clouds 140 associated with the same time to form a combined 3D point cloud. For example, as described above, the second 3D point cloud 111 and the third 3D point cloud 113 may be associated with the same time. In this example, the registered first 3D point cloud 142 and the registered second 3D point cloud 144 are therefore associated with the same time. In this example, the processor 126 is configured to fuse or combine the registered first 3D point cloud 142 and the registered second 3D point cloud 144 to generate the combined 3D point cloud 106. The processor 126 may generate multiple (e.g., a stream or sequence of) combined 3D point clouds by fusing or combining registered point clouds corresponding to the times associated with the point clouds generated based on the input data from the plurality of sensors 107, resulting in a stream or sequence of combined 3D point clouds.

The processor 126 includes a comparator 146. The comparator 146 is configured to compare each of the combined 3D point clouds to the mesh model 132. For example, the comparator 146 is configured to compare the combined 3D point cloud 106 to the mesh model 132. In some examples, the comparator 146 is configured to compare each of the combined 3D point cloud models to the mesh model by identifying, for each point of the combined 3D point cloud, a closest mesh face of the mesh model 132 to the point. For example, the comparator 146 is configured to compare the combined 3D point cloud 106 to the mesh model 132 by identifying, for each point of the combined 3D point cloud 106, a closest mesh face of the mesh model 132 to point. The closest mesh face to a point is referred to as a point's "corresponding mesh face." The comparator 146 is further configured to determine, for each point of the combined 3D point cloud 106, a distance between the point and a closest part of the corresponding mesh face. In some examples, a mesh face may not include a corresponding point of the combined 3D point cloud 106 because all of the points of the combined 3D point cloud 106 are closer to other mesh faces of the mesh model 132. The processor 126 is configured to, for each mesh face of the mesh model that is associated with multiple corresponding points of the combined 3D point cloud 106, determine a mean distance between the multiple corresponding points and the mesh face.

The processor 126 is configured to generate, based on the comparison, output data 148 indicating differences between the object 104 as represented by an as-built model (e.g., as represented by each of the combined 3D point clouds) and the object 104 as represented by the as-designed model (e.g., the 3D model 102). For example, the processor 126 is configured to generate, based on the comparison, output data 148 indicating differences 152 between the object 104 as represented by the combined 3D point cloud 106 and the object 104 as represented by the 3D model 102 of the object 104 (e.g., as represented by the mesh model 132).

In some examples, the differences 152 include a difference determined for each mesh face of the mesh model 132. In these examples, the processor 126 is configured to determine a difference for each mesh face of the mesh model 132. The difference determined for a particular mesh face that is associated with a single corresponding point of the combined 3D point cloud 106 is based on the distance between the single point and the closest part of the mesh face. The difference determined for a particular mesh face that is associated with multiple corresponding points of the combined 3D point cloud 106 is based on the mean distance between the multiple corresponding points and the mesh face (e.g., the mean distance determined for the mesh face).

The system 100 includes a display 154 configured to display a graphical display 156 of the differences 152 based on the output data 148. For example, the display 154 may include a monitor or other display device, and the graphical display 156 may include a heatmap or colormap that indicates a color for each mesh face of the mesh model 132 based on the difference (of the differences 152) determined for the mesh face. For example, the processor 126 may determine a first difference corresponding to a value of 0.5 micrometers for a first mesh face based on the mean distance between respective parts of the first mesh face and points of the combined 3D point cloud 106 that correspond to the first mesh face, and may determine a second difference corresponding to a value of 0.7 micrometers for a second mesh face based on the mean distance between respective parts of the second mesh face and points of the combined 3D point cloud 106 that correspond to the second mesh face. The display 154 may display a different color for the first mesh face than for the second mesh face, and the color used for the second mesh face may indicate a greater divergence from the 3D model 102 than the color used for the first mesh face.

Thus, the system 100 generates an output indicating a divergence between the 3D model 102 (e.g., a mesh model 132 based on an as-designed model) and a model from sensor data (e.g., an as-built model corresponding to the combined 3D point cloud 106). The output indicates, for each mesh face of the mesh model, a divergence between the mesh face and the combined 3D point cloud 106, providing an indication of divergence at a finer resolution that systems that indicate divergence on an object level. Additionally, the segmentation and registration engine 138 enables the output to be generated in real time based on streams of data from the plurality of sensors 107 as described above.

The ability to generate the output indicating the differences in real time enables real-time metrology. For example, the system 100 may enable determining, during a manufacturing process, that two components to be joined together are misaligned based on detecting a deviation between a model of the combined components and combined 3D point clouds of the components as the components are being moved into close proximity to each other. The system 100 may be configured to generate an alert based on the output data 148 indicating that the differences 152 or deviations between the as-designed model and the as-built model satisfy a threshold, which may enable the joining or combining process to be interrupted before the two components are incorrectly joined or affixed together.

As another example, the system 100 may be employed on a factory floor during a manufacturing process. In this example, the plurality of sensors 107 may be configured to provide image data of a scene of part of the factory floor that includes one or more objects including the object 104 as the object 104 moves along the factory floor during manufacture of the object 104. The system 100 may detect a new part or component on the factory floor as corresponding to the object 104 based on object recognition. The system 100 may automatically monitor the object 104 for defects by generating as-built models (e.g., combined 3D point clouds) of the object 104 as the object 104 moves through the factory. The system 100 may compare the as-built models to the as-designed model (e.g., the 3D model 102) and display results (e.g., the graphical display 156) of the comparison on a display device (e.g., the display 154). The system 100 may include capability to instruct an automated part of the manufacturing process to adjust manufacturing based on the display results indicating that an aspect of the object 104 as built is incorrect.

For example, the system 100 may be configured to detect that a manufacturing specification should be adjusted based on the output data 148 indicating that a deviation exceeds a threshold. To illustrate, a manufacturing process performed on the factory floor may include forming a hole, aperture, or void in a particular component (e.g., in the object 104), and the system 100 may be mounted and configured to monitor the production of the particular component during manufacturing of the particular component. The system 100 may be configured to detect a deviation (e.g., incorrect size or location) associated with the hole, aperture, or void based on the output data 148 indicating deviations associated with mesh faces corresponding to the hole, aperture, or void. The system 100 may determine that the deviation satisfies a threshold and may generate an alert, enabling the manufacturing process to be adjusted to produce the hole, aperture, or void at the correct size or in the correct position. Alternatively, the system 100 may automatically instruct a robot of the factory to correct the error (e.g., may instruct the robot where the hole, aperture, or void should be, thereby causing the robot to correct the location at which the robot forms the hole, aperture, or void).

Figure 2:
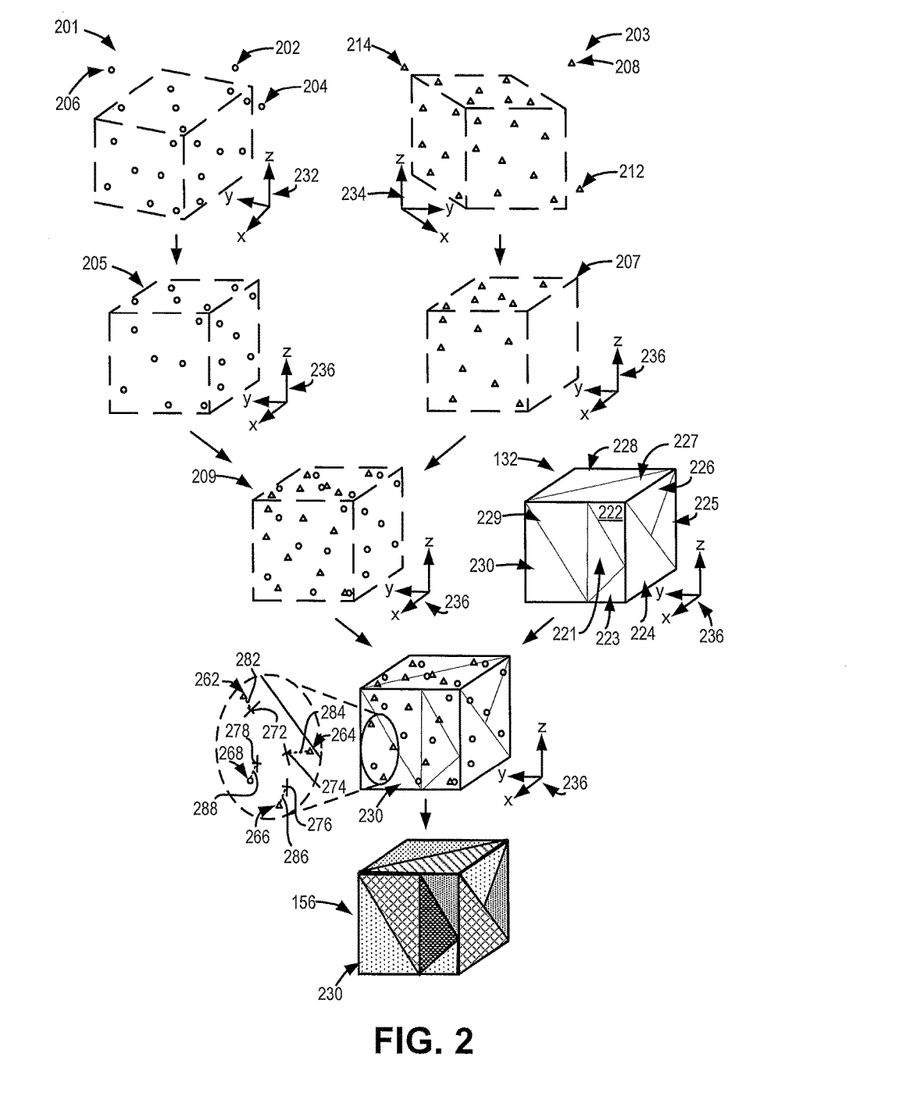
FIG. 2 illustrates example stages during operation of the system 100 of FIG. 1.

FIG. 2 illustrates example stages during operation of the system 100 of FIG. 1. During a first stage, the sensor data (e.g., the first sensor data 114 and the second sensor data 116) are collected by respective sensors of the plurality of sensors 107. For example, the first sensor data 114 and the second sensor data 116 may be collected by the first and second sensors 108, 110, respectively, of FIG. 1. For ease of illustration, only two sets of sensor data 114, 116 and related operations are illustrated in FIG. 2; however, if the system 100 includes more than two sensors, similar operations to those described below may also be performed for sensor data from each of the other sensors as well.

The second 3D point cloud 111 and the third 3D point cloud 113 are generated based on the first sensor data 114 and the second sensor data 116, respectively as described above. FIG. 2 depicts a graphical representation 201 of points of the second 3D point cloud 111 and an outline (dashed line) of an example of the object 104 included in a scene captured by the first sensor 108. The outline (dashed line) of the object 104 is depicted for context and is not present in the second 3D point cloud 111. FIG. 2 also depicts a graphical representation 203 of points of the third 3D point cloud 113 and an outline (dashed line) of an example of the object 104 included in a scene captured by the second sensor 110. The outline (dashed line) of the object 104 is depicted for context and is not present in the third 3D point cloud 113.

The second 3D point cloud 111 includes the first points 122 of FIG. 1 (e.g., the points within the dashed outline) corresponding to the object 104 and points 202, 204, 206 corresponding to other parts of the scene captured by the first sensor 108. The third 3D point cloud 113 includes the second points 124 of FIG. 1 (e.g., the points within the dashed outline) corresponding to the object 104 and points 208, 212, 214 corresponding to other parts of the scene captured by the second sensor 110. The second 3D point cloud 111 is defined in a coordinate system 232 of the first sensor 108. The third 3D point cloud 113 is defined in a coordinate system 234 of the second sensor 110.

During a second stage, the second 3D point cloud 111 and the third 3D point cloud 113 are individually segmented and registered to the first 3D point cloud 136 to generate the registered first 3D point cloud 142 and the registered second 3D point cloud 144, respectively. The second 3D point cloud 111 and the third 3D point cloud 113 may be individually segmented and registered as described above with reference to FIG. 1. FIG. 2 illustrates a graphical depiction 205 of an example the registered first 3D point cloud 142 and illustrates a graphical depiction 207 of an example of the registered second 3D point cloud 144. The registered first 3D point cloud 142 includes the first points 122 corresponding to the object 104 and does not include the points 202, 204, 206 corresponding to other parts of the scene captured by the first sensor 108. The registered first 3D point cloud 142 is registered to the coordinate system 236 of the 3D model 102. The registered second 3D point cloud 144 includes the second points 124 corresponding to the object 104 and does not include the points 208, 212, 214 corresponding to other parts of the scene captured by the second sensor 110. The registered second 3D point cloud 144 is registered to the coordinate system 236 of the 3D model 102 of FIG. 1.

During a third stage, the combined 3D point cloud 106 of FIG. 1 is generated by fusing the registered first 3D point cloud 142 and the registered second 3D point cloud 144. FIG. 2 illustrates a graphical depiction 209 of an example of the combined 3D point cloud 106 of FIG. 1.

During a fourth stage, the combined 3D point cloud 106 of FIG. 1 is compared to the mesh model 132 of FIG. 1. FIG. 2 illustrates a graphical depiction of the mesh model 132 of FIG. 1. The mesh model 132 includes a plurality of faces, such as the plurality of mesh faces 221, 222, 223, 224, 225, 226, 227, 228, 229, 230. The combined 3D point cloud 106 of FIG. 1 is compared to the mesh model 132 as described above with reference to FIG. 1. For example, the processor 126 of FIG. 1 may identify, for each point of the combined 3D point cloud 106, a closest mesh face of the plurality of mesh faces 221, 222, 223, 224, 225, 226, 227, 228, 229, 230 of the mesh model 132. For example, the processor 126 may determine that closest mesh face to the points 262, 264, 266, 268 is the mesh face 230.

The processor 126 may determine a distance between each point of the combined 3D point cloud 106 and a closest part of the point's corresponding mesh face. For example, the processor 126 may determine that a part 272 of the mesh face 230 is closest to the point 262, a part 274 of the mesh face 230 is closest to the point 264, a part 276 of the mesh face 230 is closest to the point 266, and a part 278 of the mesh face 230 is closest to the point 268. The processor 126 may determine a distance 282 between the point 262 and the part 272, a distance 284 between the point 264 and the part 274, a distance 286 between the point 266 and the part 276, and a distance 288 between the point 268 and the part 278.

For each mesh face that includes more than one corresponding point of the combined 3D point cloud 106, the processor 126 determines a mean distance between the corresponding points and the mesh face. For example, for the mesh face 230, the processor 126 may determine a mean of the distances 282, 284, 286, 288.

During a fifth stage, the processor 126 provides output data indicating the differences between the combined 3D point cloud 106 and the 3D model 102 (e.g., the mesh model 132). The differences include a difference determined for each mesh face of the mesh model 132. The output data is provided to a display 154 that displays a graphical display 156 of the differences 152. The graphical display 156 may be in the form of a heatmap or a colormap that indicates an amount of deviation from the 3D model 102 based on a color. To illustrate, FIG. 2 shows an example of the graphical display 156. Each mesh face of the graphical display 156 has a corresponding shading that may correspond to a color of a colormap. Each shading may indicate an amount of deviation between the mesh face and the combined 3D point cloud 106 based on the differences.

Figure 3:
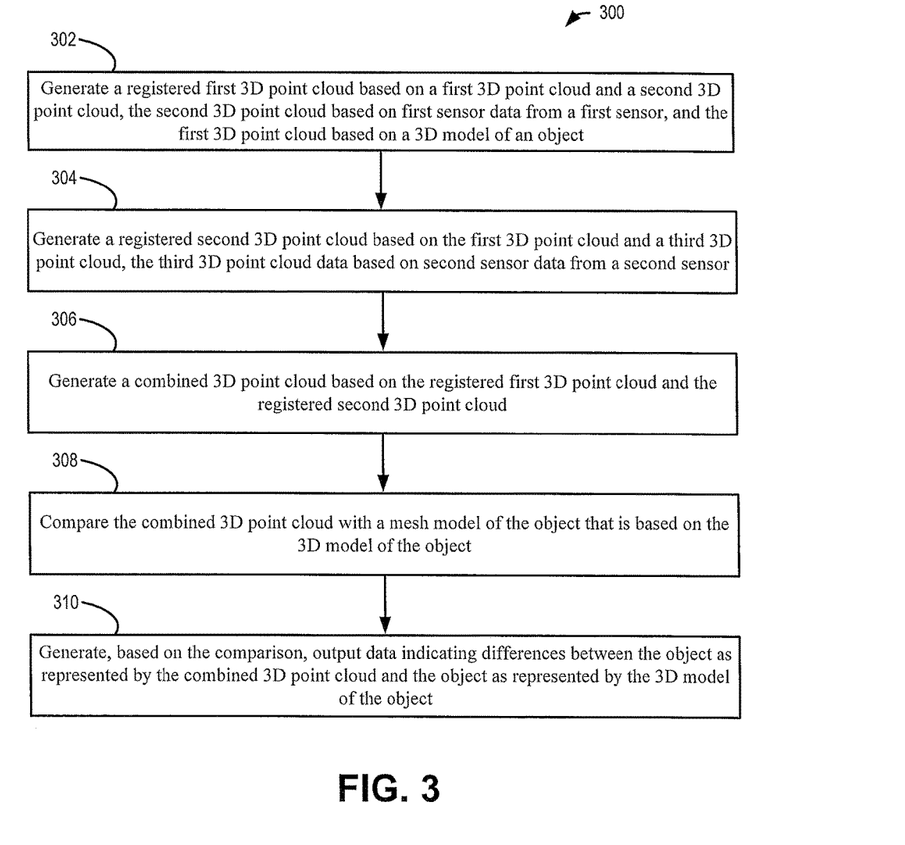
FIG. 3 is a flow chart of a method of generating output data indicating differences between a mesh model of an object and a combined 3D point cloud based on sensor data from multiple sensors.

FIG. 3 illustrates a method 300 of generating output data indicating differences between a mesh model of an object and a combined 3D point cloud based on sensor data from multiple sensors. In some examples, the method 300 is performed by the system 100 of FIG. 1. The method 300 includes, at 302, generating a registered first 3D point cloud based on a first 3D point cloud and a second 3D point cloud. For example, the registered first 3D point cloud may correspond to the registered first 3D point cloud 142 described above with reference to FIG. 1, the first 3D point cloud may correspond to the first 3D point cloud 136, and the second 3D point cloud may correspond to the second 3D point cloud 111. The second 3D point cloud is based on first sensor data from a first sensor, and the first 3D point cloud is based on a 3D model of an object. For example, the second 3D point cloud may be generated based on the first sensor data 114 and the first 3D point cloud may be generated based on the 3D model 102 of the object 104 described above with reference to FIG. 1.

The method 300 includes, at 304, generating a registered second 3D point cloud based on the first 3D point cloud and a third 3D point cloud. For example, the registered second 3D point cloud may correspond to the registered second 3D point cloud 144 described above with reference to FIG. 1, and the third 3D point cloud may correspond to the third 3D point cloud 113. The third 3D point cloud is based on second sensor data from a second sensor. For example, the third 3D point cloud may be generated based on the second sensor data 116 as described above with reference to FIG. 1.

The method 300 includes, at 306, generating a combined 3D point cloud based on the registered first 3D point cloud and the registered second 3D point cloud. For example, the combined 3D point cloud may correspond to the combined 3D point cloud 106 described above with reference to FIG. 1, and the combined 3D point cloud may be generated by the processor 126 as described above with reference to FIG. 1. In implementations in which the system 100 includes more than two sensors, registered point clouds are generated based on sensors data from the other sensors as well. In such implementations, the combined 3D point cloud is also based on the registered point clouds associated with the other sensors.

The method 300 includes, at 308, comparing the combined 3D point cloud with a mesh model of the object that is based on the 3D model of the object. For example, the mesh model may correspond to the mesh model 132 of FIG. 1 or 2. The combined 3D point cloud may be compared with the mesh model as described above with reference to FIGS. 1 and 2. In some implementations, comparing the combined 3D point cloud with the mesh model of the object includes, for each point of the combined 3D point cloud determining a corresponding mesh face of the mesh model. For example, the processor 126 of FIG. 1 may determine a corresponding mesh face of the mesh model for each point of the combined 3D point cloud as described above with reference to FIG. 1. In some implementations, comparing the combined 3D point cloud with the mesh model additionally includes determining a distance between the point and the corresponding mesh face of the point. In some implementations, comparing the combined 3D point cloud with the mesh model includes, for each mesh face of the mesh model that is associated with multiple corresponding points of the combined 3D point cloud, determining a mean distance between the multiple corresponding points and the mesh face.

The method 300 additionally includes, at 310, generating, based on the comparison, output data indicating differences between the object as represented by the combined 3D point cloud and the object as represented by the 3D model of the object. In some implementations, the differences include a difference determined for each mesh face of the mesh model, and wherein the difference for a particular mesh face that is associated with multiple corresponding points of the combined 3D point cloud is based on the mean distance determined for the mesh face.

In some implementations, the method 300 additionally includes displaying the differences. For example, the differences may be displayed using a colormap, where each mesh face of the mesh model is assigned a color based on the difference determined for the mesh face. Thus, the display graphically indicates the differences between the object as built and the object as designed.

Figure 4:
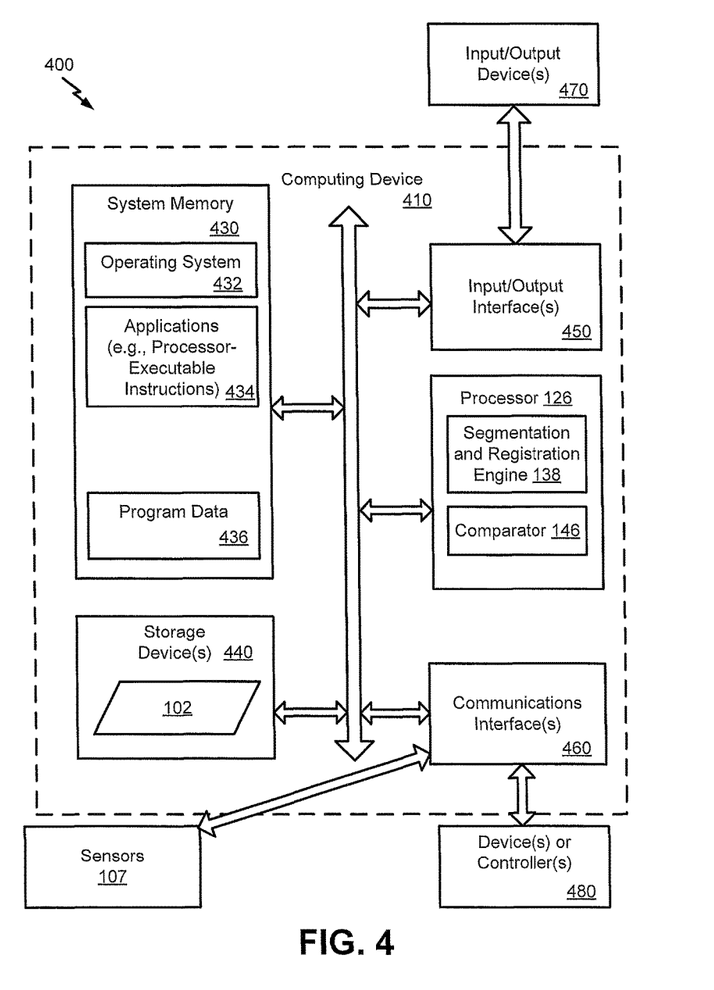
FIG. 4 is a block diagram of a particular example of a computing environment configured to support generation of output data indicating differences between a mesh model of an object and a combined 3D point cloud based on sensor data from multiple sensors.

FIG. 4 is an illustration of a block diagram of a computing environment 400 including a device 410 (e.g., a general purpose computing device) configured to support embodiments of computer-implemented methods and processor-executable program instructions (or code) according to the present disclosure. For example, the computing device 410, or portions thereof, may execute processor-executable instructions to perform the functions of the system 100 or functions of a portion of the system 100, such as the processor 126. The processor-executable instructions to control the system 100 (or of a portion of the system 100, such as the processor 126, the segmentation and registration engine 138 or the comparator 146) may include processor-executable instructions to generate the combined 3D point cloud 106 of FIG. 1, compare the combined 3D point cloud 106 with the mesh model 132, and generate the output data 148 indicating the differences 152 as described above with reference to FIG. 1, 2, or 3. The computing device 410, or portions thereof, may further execute processor-executable instructions according to any of the methods described herein, such as the method 300 of FIG. 3.

The processor 126 may communicate with a non-transitory processor readable medium, such as system memory 430, one or more storage devices 440, or a combination thereof. The processor 126 may additionally communicate with one or more input/output interfaces 450, one or more communications interfaces 460, or a combination thereof. The system memory 430 may include volatile memory devices (e.g., random access memory (RAM) devices), nonvolatile memory devices (e.g., read-only memory (ROM) devices, programmable read-only memory, and flash memory), or both. The system memory 430 may include an operating system 432, which may include a basic/input output system for booting the computing device 410 as well as a full operating system to enable the computing device 410 to interact with users, other programs, and other devices. The system memory 430 may include or store one or more applications (e.g., processor-executable instructions) 434 which may be executable by the processor 126. For example, the one or more applications 434 may include processor-executable instructions executable by the processor 420 to perform one or more functions or steps described above with reference to FIGS. 1-3.

For example, the system memory 430 may store processor-executable instructions that, when executed by processor 126, cause the processor 126 to generate a registered first 3D point cloud based on a first 3D point cloud and a second 3D point cloud as described above with reference to FIGS. 1-3. The processor-executable instructions, when executed by the processor 126, cause the processor 126 to generate a registered second 3D point cloud based on the first 3D point cloud and a third 3D point cloud as described above with reference to FIGS. 1-3. The processor-executable instructions, when executed by the processor 126, cause the processor 126 to generate a combined 3D point cloud based on the registered first 3D point cloud and the registered second 3D point cloud as described above with reference to FIGS. 1-3. The processor-executable instructions, when executed by the processor 126, cause the processor 126 to compare the combined 3D point cloud with a mesh model of the object that is based on the 3D model of the object as described above with reference to FIGS. 1-3. The processor-executable instructions, when executed by the processor 126, cause the processor 126 to generate, based on the comparison, output data indicating differences between the object as represented by the combined 3D point cloud and the object as represented by the 3D model of the object as described above with reference to FIGS. 1-3.

The processor 420 may also communicate with one or more storage devices 440. For example, the one or more storage devices 440 may include nonvolatile storage devices, such as magnetic disks, optical disks, or flash memory devices. The storage devices 440 may include both removable and non-removable memory devices. The storage devices 440 may be configured to store an operating system, images of operating systems, applications, and program data. The storage devices 440 may also store the 3D model 102. In a particular embodiment, the system memory 430, the storage devices 440, or both, include tangible computer-readable media.

The processor 126 may communicate with one or more input/output interfaces 450 that enable the computing device 410 to communicate with one or more input/output devices 470 to facilitate user interaction. The input/output interfaces 450 may include serial interfaces (e.g., universal serial bus (USB) interfaces or Institute of Electrical and Electronics Engineers (IEEE) 1394 interfaces), parallel interfaces, display adapters, audio adapters, and other interfaces. The input/output devices 470 may include keyboards, pointing devices, displays, speakers, microphones, touch screens, and other devices. The processor 126 may detect interaction events based on user input received via the input/output interfaces 450. Additionally, the processor 126 may send a display to a display device (e.g., the output device 180) via the input/output interfaces 450.

The processor 126 may communicate with the plurality of sensors 107, one or more devices 480, or a combination thereof, via the one or more communications interfaces 460. The one or more communications interfaces 460 may include wired Ethernet interfaces, IEEE 802 wireless interfaces, other wireless communication interfaces, or other network interfaces. The one or more devices 480 may include host computers, servers, workstations, and other computing devices.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

The flowcharts, modules, or components shown in the attached figures may represent the hardware that operates based on software instructions and hardware logic, the software that directs hardware to perform operations, or a combination thereof. In particular, the segmentation and registration engine 138, the comparator 146, or a combination thereof, described above with reference to FIGS. 1-4 transforms the processor 126 described above with reference to FIGS. 1-4 into a special purpose processor as compared to processors that do not have the segmentation and registration engine 138, the comparator 146, or a combination thereof, described above with reference to FIGS. 1-4.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A system including:
   a first sensor configured to generate first sensor data corresponding to an object undergoing a manufacturing operation;
   a second sensor configured to generate second sensor data corresponding to the object undergoing the manufacturing operation;
   memory configured to store a three-dimensional (3D) model representing the object at a stage during or after the manufacturing operation;
   a processor configured to:
      generate a registered first 3D point cloud based on a first 3D point cloud and a second 3D point cloud, the second 3D point cloud based on the first sensor data and the first 3D point cloud based on the 3D model;
      generate a registered second 3D point cloud based on the first 3D point cloud and a third 3D point cloud that is based on the second sensor data;
      generate a combined 3D point cloud based on the registered first 3D point cloud and the registered second 3D point cloud;
      performing a comparison of the combined 3D point cloud with a mesh model that is based on the 3D model; and
      generate, based on the comparison, output data indicating differences between the object as represented by the combined 3D point cloud and the object as represented by the 3D, wherein the output data indicates that a distance between a first feature of the object and a second feature of the object is different than a corresponding distance of the 3D model; and
   a display configured to display, during the manufacturing operation, a graphical display of the differences based on the output data.

2. The system of claim 1, wherein the registered first 3D point cloud and the registered second 3D point cloud are registered to a coordinate system of the 3D model.

3. The system of claim 1, wherein the processor is configured to execute an iterative closest point algorithm to generate the registered first 3D point cloud and the registered second 3D point cloud.

4. The system of claim 1, wherein, to perform the comparison of the combined 3D point cloud with the mesh model, the processor is configured to, for each point of the combined 3D point cloud:
   determine a corresponding mesh face of the mesh model; and
   determine a distance between the point and the corresponding mesh face of the point.

5. The system of claim 4, wherein, to perform the comparison of the combined 3D point cloud with the mesh model, the processor is further configured to, for each mesh face of the mesh model that is associated with multiple corresponding points of the combined 3D point cloud, determine a mean distance between the multiple corresponding points and the mesh face.

6. The system of claim 5, wherein the differences include a difference determined for each mesh face of the mesh model, and wherein the difference for a particular mesh face that is associated with multiple corresponding points of the combined 3D point cloud is based on the mean distance determined for the mesh face.

7. The system of claim 1, wherein the 3D model includes a computer aided design (CAD) model, and wherein the processor is further configured to:
   generate the mesh model based on the CAD model; and
   generate the first 3D point cloud based on the CAD model.

8. A method comprising:
   generating a registered first three-dimensional (3D) point cloud based on a first 3D point cloud and a second 3D point cloud, the second 3D point cloud based on first sensor data from a first sensor, and the first 3D point cloud based on a 3D model representing an object at a stage during or after a manufacturing operation, the first sensor data corresponding to the object undergoing the manufacturing operation;
   generating a registered second 3D point cloud based on the first 3D point cloud and a third 3D point cloud, the third 3D point cloud based on second sensor data from a second sensor, the second sensor data corresponding to the object undergoing the manufacturing operation;
   generating a combined 3D point cloud based on the registered first 3D point cloud and the registered second 3D point cloud;
   performing a comparison of the combined 3D point cloud with a mesh model that is based on the 3D model;
   generating, based on the comparison, output data indicating differences between the object as represented by the combined 3D point cloud and the object as represented by the 3D model, wherein the output data indicates that a distance between a first feature of the object and a second feature of the object is different than a corresponding distance of the 3D model; and
   providing the output data to an output device, the output data provided during the manufacturing operation.

9. The method of claim 8, wherein the registered first 3D point cloud and the registered second 3D point cloud are registered to a coordinate system of the 3D model.

10. The method of claim 9, wherein generating the registered first 3D point cloud and the registered second 3D point cloud includes executing an iterative closest point algorithm.

11. The method of claim 10, wherein performing the comparison of the combined 3D point cloud with the mesh model includes, for each point of the combined 3D point cloud:
    determining a corresponding mesh face of the mesh model; and
    determining a distance between the point and the corresponding mesh face of the point.

12. The method of claim 11, wherein performing the comparison of the combined 3D point cloud with the mesh model includes, for each mesh face of the mesh model that is associated with multiple corresponding points of the combined 3D point cloud, determining a mean distance between the multiple corresponding points and the mesh face.

13. The method of claim 12, wherein the differences include a difference determined for each mesh face of the mesh model, and wherein the difference for a particular mesh face that is associated with multiple corresponding points of the combined 3D point cloud is based on the mean distance determined for the mesh face.

14. The method of claim 13, wherein the 3D model includes a computer aided design (CAD) model, and further comprising:
    generating the mesh model based on the CAD model; and
    generating the first 3D point cloud based on the CAD model.

15. A non-transitory processor-readable medium storing processor-executable instructions that, when executed by a processor, cause the processor to:

generate a registered first three-dimensional (3D) point cloud based on a first 3D point cloud and a second 3D point cloud, the second 3D point cloud based on first sensor data from a first sensor, and the first 3D point cloud based on a 3D model representing an object at a stage during or after a manufacturing operation, the first sensor data corresponding to the object undergoing the manufacturing operation;

generate a registered second 3D point cloud based on the first 3D point cloud and a third 3D point cloud, the third 3D point cloud based on second sensor data from a second sensor, the second sensor data corresponding to the object undergoing a manufacturing operation;

generate a combined 3D point cloud based on the registered first 3D point cloud and the registered second 3D point cloud;

perform a comparison of the combined 3D point cloud with a mesh model that is based on the 3D model of the object;

generate, based on the comparison, output data indicating differences between the object as represented by the combined 3D point cloud and the object as represented by the 3D model, wherein the output data indicates a distance between a first feature of the object and a second feature of the object is different than a corresponding distance of the 3D model; and providing the output data to an output device, the output data provided during the manufacturing operation.

16. The non-transitory processor-readable medium of claim 15, wherein the registered first 3D point cloud and the registered second 3D point cloud are registered to a coordinate system of the 3D model.

17. The non-transitory processor-readable medium of claim 16, wherein generating the registered first 3D point cloud and the registered second 3D point cloud includes executing an iterative closest point algorithm.

18. The non-transitory processor-readable medium of claim 17, wherein performing the comparison of the combined 3D point cloud with the mesh model includes, for each point of the combined 3D point cloud:
  determining a corresponding mesh face of the mesh model; and
  determining a distance between the point and the corresponding mesh face of the point.

19. The non-transitory processor-readable medium of claim 18, wherein performing the comparison of the combined 3D point cloud with the mesh model includes, for each mesh face of the mesh model that is associated with multiple corresponding points of the combined 3D point cloud, determining a mean distance between the multiple corresponding points and the mesh face.

20. The non-transitory processor-readable medium of claim 19, wherein the differences include a difference determined for each mesh face of the mesh model, and wherein the difference for a particular mesh face that is associated with multiple corresponding points of the combined 3D point cloud is based on the mean distance determined for the mesh face.

* * * * *

UNITED STATES PATENT AND TRADEMARK OFFICE
CERTIFICATE OF CORRECTION

PATENT NO. : 10,255,480 B2
APPLICATION NO. : 15/595806
DATED : April 9, 2019
INVENTOR(S) : Ryan Uhlenbrock et al.

It is certified that error appears in the above-identified patent and that said Letters Patent is hereby corrected as shown below:

In the Claims

Column 19, Claim 15, Line 18-19, delete "of the object."

Signed and Sealed this
Eighteenth Day of June, 2019

Andrei Iancu
*Director of the United States Patent and Trademark Office*